Nov. 24, 1959  J. D. TURLAY  2,914,130
THROTTLE LINKAGE MECHANISM
Filed May 14, 1958  2 Sheets-Sheet 1
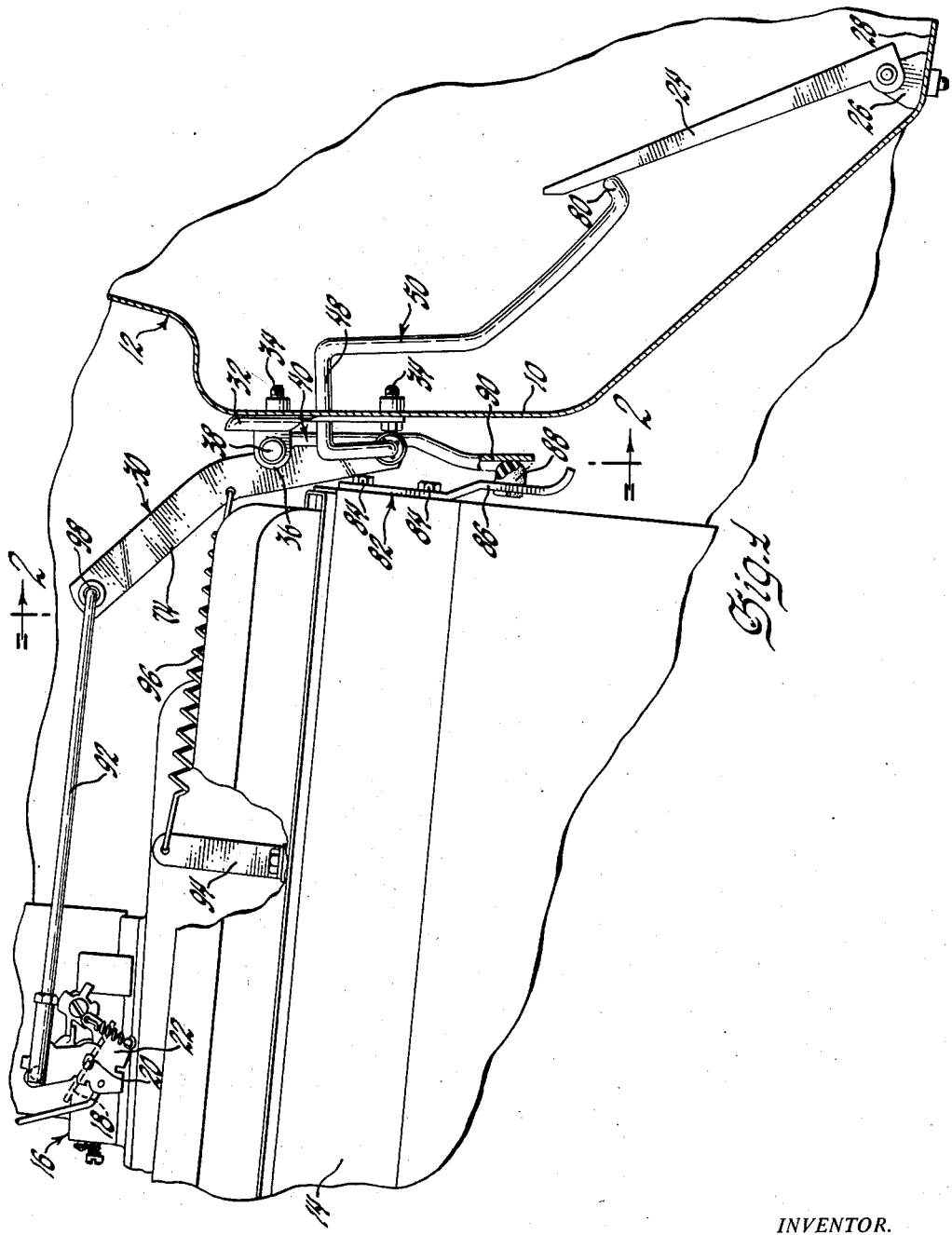
INVENTOR.
Joseph D. Turlay
BY
R. F. Barnard
ATTORNEY

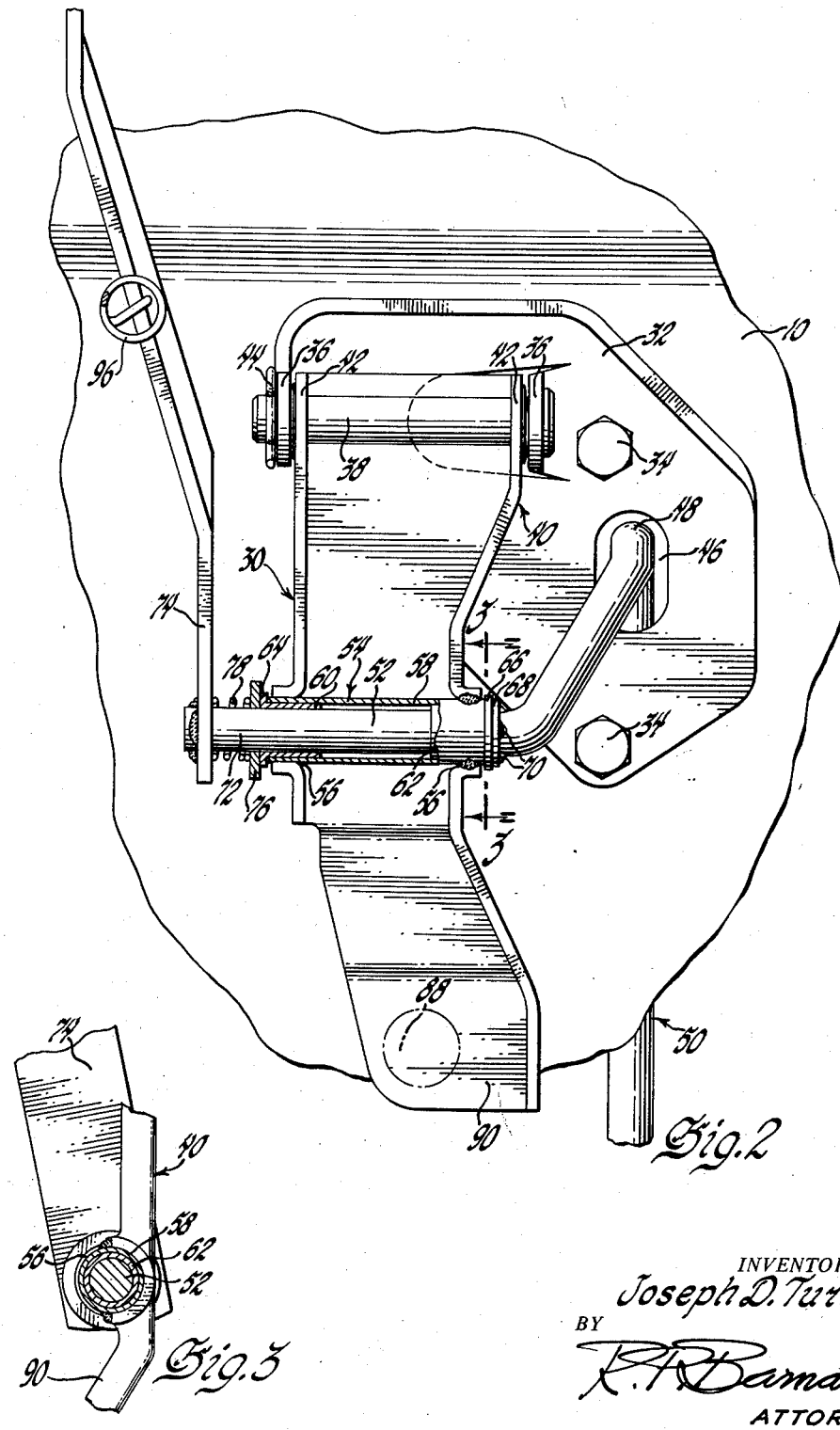

United States Patent Office 2,914,130
Patented Nov. 24, 1959

2,914,130

THROTTLE LINKAGE MECHANISM

Joseph D. Turlay, Flint, Mich., assignor to General Motors Corporation, Detroit, Mich., a corporation of Delaware Application May 14, 1958, Serial No. 735,272

3 Claims. (Cl. 180—77)

The present invention relates to an improved linkage mechanism for connecting an accelerator pedal to a carburetor throttle valve. More specifically the present invention relates to a throttle control mechanism in which the relative movements of the engine with respect to the vehicle body are isolated in such a way as not to affect throttle position.

It has long been the practice to mount an automotive engine to the vehicle frame through resilient mounts or bushings. In this way engine vibrations and movements tend to be dissipated or minimized and hence not transmitted to the vehicle body. It is now proposed to also resiliently mount the vehicle body relative to the frame in which case the potential relative movement between the engine and body is considerably increased. With this increased relative movement is the increased disruption of throttle position with presently known throttle control linkage mechanisms.

In accelerator pedal-throttle linkage systems it has been the practice to connect the accelerator pedal and the throttle valve in a way in which engine movement relative to the vehicle body will cause an unintended change in throttle valve position. The present invention is directed to correcting this undesired actuation of the throttle valve by providing a linkage control mechanism in which engine movement, either torque induced rotation or fore and aft pitching, may take place without affecting throttle position. Further it is intended that such engine movement take place without the operator being aware of any change in accelerator pedal position.

In the present invention the accelerator pedal is loosely connected to a control rod which is in turn mounted to an equalizer link pivotally fixed at one end to the vehicle body and loosely connected at its other end to an additional bracket fixed to the engine. An additional lever is fixed to the control rod whereby rotation of the latter by the accelerator pedal may be transmitted through a link suitably articulated to the lever and the throttle valve to actuate the latter. During normal operation the equalizer link is in effect fixed at both ends and the control rod pivots relative thereto in the normal manner. However, if the engine should pitch forwardly, the engine mounted bracket will move away from the link causing the latter to pivot about the body mounted bracket and in so doing absorbs or accommodates the engine movement without transmitting the same to the throttle valve. Correspondingly torque induced rotative movement of the engine relative to the body is absorbed by the link connecting the control rod actuated lever and the throttle valve.

As already noted, the control rod is loosely mounted with respect to the accelerator pedal and is shaped in such a way that any movement of the control rod by way of adjusting the linkage mechanism for engine movement causes the end of the rod which cooperates with the accelerator pedal to be slidably moved generally in the plane of the pedal so that essentially no movement of the latter takes place during engine movement.

Other objects and advantages of the subject device will be apparent from a perusal of the detailed description which follows.

In the drawings:

Figure 1 is an elevational view of a portion of a vehicle embodying the subject invention;

Figure 2 is an enlarged detail view of a portion of the throttle controlling linkage; and Figure 3 is a view along line 3—3 of Figure 2.

Referring to Figure 1, a cowl or fire wall 10 of a vehicle body 12 is disposed proximate the rear end of an engine indicated generally at 14. A carburetor 16 is mounted in the usual manner on the engine intake manifold and includes a throttle valve 18 mounted on a shaft 20. Shaft 20 in turn has a throttle lever 22 fixed thereto.

An accelerator pedal 24 is pivotally mounted on a bracket 26 fixed to the floor 28 of vehicle body 12. The accelerator pedal is adapted to control the actuation of the throttle valve through a linkage mechanism indicated generally at 30 the latter which constitutes the subject matter of the present invention.

A bracket 32 is fixed to the forward side of the body wall 10 through suitable stud members 34. Bracket 32 includes a pair of trunnion members 36 through which a stud 38 extends to pivotally support one end of an equalizer link 40. Link 40 also includes a pair of centrally apertured trunnions 42 adapted to be aligned with bracket trunnions 36 and through which stud 38 extends to pivotally connect this subassembly. Stud 38 is suitably peripherally relieved to receive a pin 44 to lock the stud against axial movement.

Bracket 32 and wall 10 are perforated at 46 to permit a U-shaped section 48 of a control rod 50 to extend therethrough. Control rod 50 includes a portion 52, as best seen in Figure 2, which extends generally at 90° to the U-shaped section 48. Control rod portion 52 is adapted to be rotatably supported within a bearing assembly 54 suitably fixed within a journal supporting opening 56 formed within equalizer link 40 intermediate the ends thereof. Bearing assembly 54 includes a cylindrical sleeve member 58 suitably fixed within the link opening 56 and a pair of short journal members 60 and 62 press fitted within the ends of sleeve 58. Journal members 60 and 62 rotatably support control rod portion 52.

Journal members 60 and 62 include flanges 64 and 66 at their outer ends and which flanges abuttingly engage the ends of sleeve 58. A washer 68 is disposed on rod portion 52 and is adapted to abut against stops 70 suitably formed on the rod.

As seen in Figure 2, the free end 72 of rod portion 52 projects beyond equalizer link 40 and has a lever 74 fixed thereto. Another washer 76 is mounted on rod portion 52 intermediate lever 74 and journal member 60. A spring member 78 surrounds rod end 72 intermediate lever 74 and washer 76 resiliently urging control rod 50 to the left as viewed in Figure 2. This arrangement permits relative axial adjustment of the equalizer link-control rod subassembly to prevent the parts from binding during assembly as well as to permit limited adjustment of the parts due to engine movement.

The other or accelerator pedal contacting end 80 of control rod 50 abuttingly engages accelerator pedal 24 but is free to move relative thereto as will be considered subsequently in greater detail.

A bracket 82 is fixed to the rear end of the block or cylinder head of engine 14 through suitable stud means 84. The lower end of bracket 82 includes a rearwardly offset portion 86 on which a suitable hemispherically shaped bearing member 88 is mounted. Bearing member 88 may be of any suitable material having a limited amount of resilience such as rubber or any suitable well wearing plastic substance.

The free end 90 of equalizer link 40 is normally engaged by bearing member 88 to retain the equalizer link against pivotal movement about the supporting stud 38.

A link member 92 is articulated between throttle control lever 22 and the accelerator pedal controlled lever 74.

A bracket 94 is suitably mounted on engine 14 and anchors one end of a tension spring element 96, the other end of which is connected intermediate the ends of lever 74. Spring 96 normally biases the lever 74 in a counterclockwise direction, as viewed in Figure 1, in which throttle valve 18 is urged in a closing direction and end 80 of control rod 50 will engage accelerator pedal 24.

As thus far described, and assuming no relative movement of engine 14 relative to vehicle body 12, it will be seen that as the accelerator pedal 24 is depressed, moved in a counterclockwise direction, control rod 50 will be caused to rotate in a clockwise direction about its equalizer link journal bearing 54 and in so doing impart a similar movement to lever 74 which causes the link 92 to impart an opening movement to throttle valve 18.

Since, as noted, it is now accepted practice to resiliently mount an engine upon the vehicle frame to isolate engine vibrations from the vehicle body, engine torque reaction causes the engine to rotate a slight amount relative to the vehicle frame and hence to the vehicle body which is in turn either fixedly or resiliently mounted on the frame. In the present control linkage mechanism, by articulating link 92 between levers 22 and 74 and properly selecting its length relative to other members of the mechanism the torque reaction induced rotation of the engine will permit the link to be inclined relative to the aforenoted levers and in so doing will accommodate this limited movement preventing the latter from varying the throttle position.

The articulation of link 92, as already described, will not, however, compensate for the fore and aft or pitching movement of the engine relative to the vehicle body. It is the function of the equalizer link 40 and associated brackets 32 and 82 to permit the fore and aft engine movement to take place without affecting the position of throttle valve 18.

As may best be seen in Figure 1, the point of articulation 98 between lever 74 and link 92 and the bearing member 88 may be considered fixed to the engine at least insofar as fore and aft movement of the latter is concerned. Accordingly, forward movement of the engine relative to the vehicle body, as might be occasioned by sudden deceleration, will cause point 98 and member 88 to move forwardly with the engine. Without means compensating therefor the forward movement of point 98 would cause a reaction against the operator's foot on the accelerator pedal thereby imparting an opening movement to the throttle 18. However, spring 96 exerts a clockwise movement upon lever 74 about pivot point 98 which in turn causes equalizer link 40 to pivot in a clockwise direction about stud 38. As a result the free end of the link moves forwardly in contact with the bearing member 88. In this way the linkage mechanism components are maintained in operative engagement with each other while still accommodating the relative forward movement of the engine.

At the same time, control rod 50 is suitably shaped so that the movement thereof occasioned by the pivoting of equalizer link 40 about stud 38 causes end 80 thereof to, in general, move in the plane of accelerator pedal 24 and therefore to slide relative to the latter while still maintaining itself in operative engagement therewith.

While not shown, it is to be understood that any suitable spring means might be employed to exert a very light bias on pedal 24 to urge the same into abutting engagement with rod 50. By this mechanism the movement of the engine relative to the body is not only prevented from influencing the position of the throttle valve but it also may take place without being noticed by the operator since the throttle controlling components have been arranged in such a way as to always be in operative engagement notwithstanding the relative movements which take place to permit the necessary adjustments for the engine movements as noted.

In summary it may be seen that the subject throttle control mechanism 30 includes lost motion means between throttle 18 and accelerator pedal 24 which permits relative movement between engine 14 and body 12 to take place without altering the rotative position of the throttle. Further, equalizer link 40 and accelerator rod 50 have been so constructed and oriented that engine induced pivoting of the rod about stud 38 occurs in such a way that free end 80 of the rod abuttingly engages pedal 24 at different radial points relative to the pivotal connection of the pedal to floor bracket 26. In this way both the throttle and operator are unaware of the relative movement between the engine and the vehicle body. Improved driving vehicle characteristics are thus achieved through isolation of the aforenoted relative engine-body movement.

It is apparent that structural modifications may be made in the illustrated embodiment of the subject mechanism within the intended scope of the invention as set forth in the appended claims.

I claim:

1. A vehicle of the type in which an internal combustion engine is mounted for limited movement relative to the vehicle body, said engine including a carburetor having a throttle valve and a mechanism for controlling said throttle valve in which said mechanism comprises an accelerator pedal pivotally mounted upon the vehicle body, the body including a wall disposed in proximately spaced relation to the engine, a first link pivotally supported at one end upon said wall adjacent the engine, a rod rotatably supported upon the link intermediate the ends thereof, said wall having an opening therein, a portion of said rod projecting through the wall opening and terminating in an end abuttingly engaging the accelerator pedal, a first lever fixed to the other end of said rod, a second lever fixed to the throttle valve, a second link articulated between said levers to permit limited rotation of the engine relative to the first lever, abutment means on said engine adapted to engage the free end of the first link, and means urging the free end of said link into engagement with the abutment means.

2. A vehicle of the type in which an internal combustion engine is mounted for limited movement relative to the vehicle body, said engine including a carburetor having a throttle valve and a mechanism for controlling said throttle valve in which said mechanism comprises an accelerator pedal pivotally mounted upon the vehicle body, the body including a wall disposed in proximately spaced relation to the engine, a bracket mounted on said wall, a first link pivotally supported at one end upon said bracket, a rod rotatably supported upon the link intermediate the ends thereof, said wall and bracket having an opening therethrough, a portion of said rod projecting through the opening and terminating in an end abuttingly engaging the accelerator pedal, a first lever fixed to the other end of said rod, a second lever fixed to the throttle valve, a second link articulated between said levers to permit limited rotation of the engine relative to the first lever, a bracket mounted on said engine, abutment means disposed on the engine bracket and adapted to engage the free end of the first link, and means urging the free end of said link into engagement with the abutment means.

3. A vehicle of the type in which an internal combustion engine is mounted for limited movement relative to the vehicle body, said engine including a carburetor having a throttle valve and a mechanism for controlling said throttle valve in which said mechanism comprises an accelerator pedal pivotally mounted upon the vehicle body, the body including a wall disposed in proximately spaced relation to the engine, a bracket mounted on said wall adjacent said engine, a first link pivotally supported at one end upon said bracket and including a free end depending intermediate said engine and said wall, a rod rotatably supported upon the link intermediate the ends thereof, said wall having an opening therein, a portion of said rod projecting through the wall opening and terminating in an end abuttingly engaging the accelerator pedal, said pedal being adapted to rotate said rod relative to said link, a first lever fixed to the other end of said rod, a second lever fixed to the throttle valve, a second link articulated between said levers to permit limited rotation of the engine relative to the first lever, a bracket mounted on said engine intermediate the engine and the first link, abutment means disposed on the engine bracket and adapted to engage the free end of the first link, and means urging the free end of said link into engagement with the abutment means, said rod and said first link being constructed and arranged that rotation of said first link will cause said rod to abuttingly engage said pedal at different radial points relative to the pivotal connection of the pedal to the vehicle body.

References Cited in the file of this patent

FOREIGN PATENTS 736,761    Great Britain _____ Sept. 14, 1955